United States Patent [19]

Baggs et al.

[11] Patent Number: 5,156,020
[45] Date of Patent: Oct. 20, 1992

[54] COOLING APPARATUS

[75] Inventors: Michael J. G. Baggs, Dronfield; Andrew A. Brownjohn, Epsom, both of England

[73] Assignee: The BOC Group plc, Windlesham, England

[21] Appl. No.: 618,559

[22] Filed: Nov. 27, 1990

[30] Foreign Application Priority Data

Nov. 29, 1989 [GB] United Kingdom ............... 8927016

[51] Int. Cl.⁵ .................. F25D 25/02; F25D 17/02
[52] U.S. Cl. ........................................ 62/381; 62/63; 62/336; 62/374
[58] Field of Search ............... 62/374, 381, 64, 65, 62/336; 99/517

[56] References Cited

U.S. PATENT DOCUMENTS

| 2,196,643 | 4/1940 | Reeh | 62/336 X |
|---|---|---|---|
| 2,722,807 | 11/1955 | Downing | 62/336 |
| 2,784,567 | 3/1957 | Reynolds | 62/336 X |
| 3,097,501 | 7/1963 | Pappas | 62/381 X |
| 3,297,454 | 1/1967 | Webster et al. | 62/64 X |
| 3,298,188 | 1/1967 | Webster et al. | 62/64 X |
| 3,485,055 | 12/1969 | Webster et al. | 62/65 X |
| 3,779,034 | 12/1973 | Morgan | 62/381 |
| 3,793,937 | 2/1974 | Lipoma | 62/64 X |
| 3,797,272 | 3/1974 | Huey | 62/381 |
| 3,952,757 | 4/1976 | Huey | 62/381 X |
| 4,528,819 | 7/1985 | Klee | 62/374 X |
| 4,655,047 | 4/1987 | Temple et al. | 62/64 |
| 4,798,614 | 1/1989 | Aubry | 62/381 X |
| 4,921,719 | 5/1990 | Kohlbach | 99/517 X |
| 4,989,416 | 2/1991 | Miller et al. | 62/381 |
| 5,009,150 | 4/1991 | Anderson | 62/381 X |

FOREIGN PATENT DOCUMENTS

| 56811 | 10/1952 | France | 62/381 |
|---|---|---|---|
| 0765608 | 9/1980 | U.S.S.R. | 62/381 |
| 1330423 | 8/1987 | U.S.S.R. | 62/64 |

Primary Examiner—Henry A. Bennet
Assistant Examiner—Christopher Kilner
Attorney, Agent, or Firm—Coleman R. Reap; Larry R. Cassett

[57] ABSTRACT

An apparatus for freezing foodstuffs includes a drum 1 mounted for rotary movement at an angle to the horizontal such that individual compartments 12 in the drum 1 successively descend into and rise from a vessel 11 containing cryogenic fluid. Frozen products tumble under gravity towards a central outlet 5 in one surface 4 of the drum, guided by the curved partitions 14 defining individual compartments 12.

8 Claims, 3 Drawing Sheets

COOLING APPARATUS

BACKGROUND OF THE INVENTION

The present invention relates to cooling apparatus and in particular to apparatus for deep freezing products.

It is known from U.S. Pat. No. 4,798,614, for apparatus for deep freezing foodstuffs to include a transportation device for the foodstuffs which includes a rotating drum. The drum is divided into a series of compartments by radial partition walls. Each compartment successively is loaded with a predetermined quantity of product to be frozen and a cryogenic fluid.

A product loading device and a device for spraying the cryogenic fluid into successive compartments are arranged adjacent each other at a position arcuately spaced from a removal device in the form of a chute for receiving the frozen products.

A disadvantage of this known apparatus is that it requires the injection into each compartment of a predetermined amount of cryogenic fluid which is sprayed into each compartment successively.

It is an aim of the present invention to provide an apparatus for cooling products which is inexpensive to produce and relatively simple to operate.

SUMMARY OF THE INVENTION

According to the present invention an apparatus for cooling products comprises a drum mounted for rotary movement such that a portion of its periphery extends into a vessel for containing cryogenic fluid, at least one partition dividing the drum into compartments, an inlet for delivering products to successive compartments as the drum rotates and an outlet for cooled products located along the central axis of the drum at one surface thereof, the axis of rotation of the drum being arranged at an angle to the horizontal such that product within the compartments will move under gravity towards the said one surface.

BRIEF DESCRIPTION OF DRAWINGS

Embodiments of the invention will now be described, by way of example, reference being made to the figures of the accompanying diagrammatic drawings in which.

DESCRIPTION OF PREFERRED EMBODIMENTS

Figure 1:
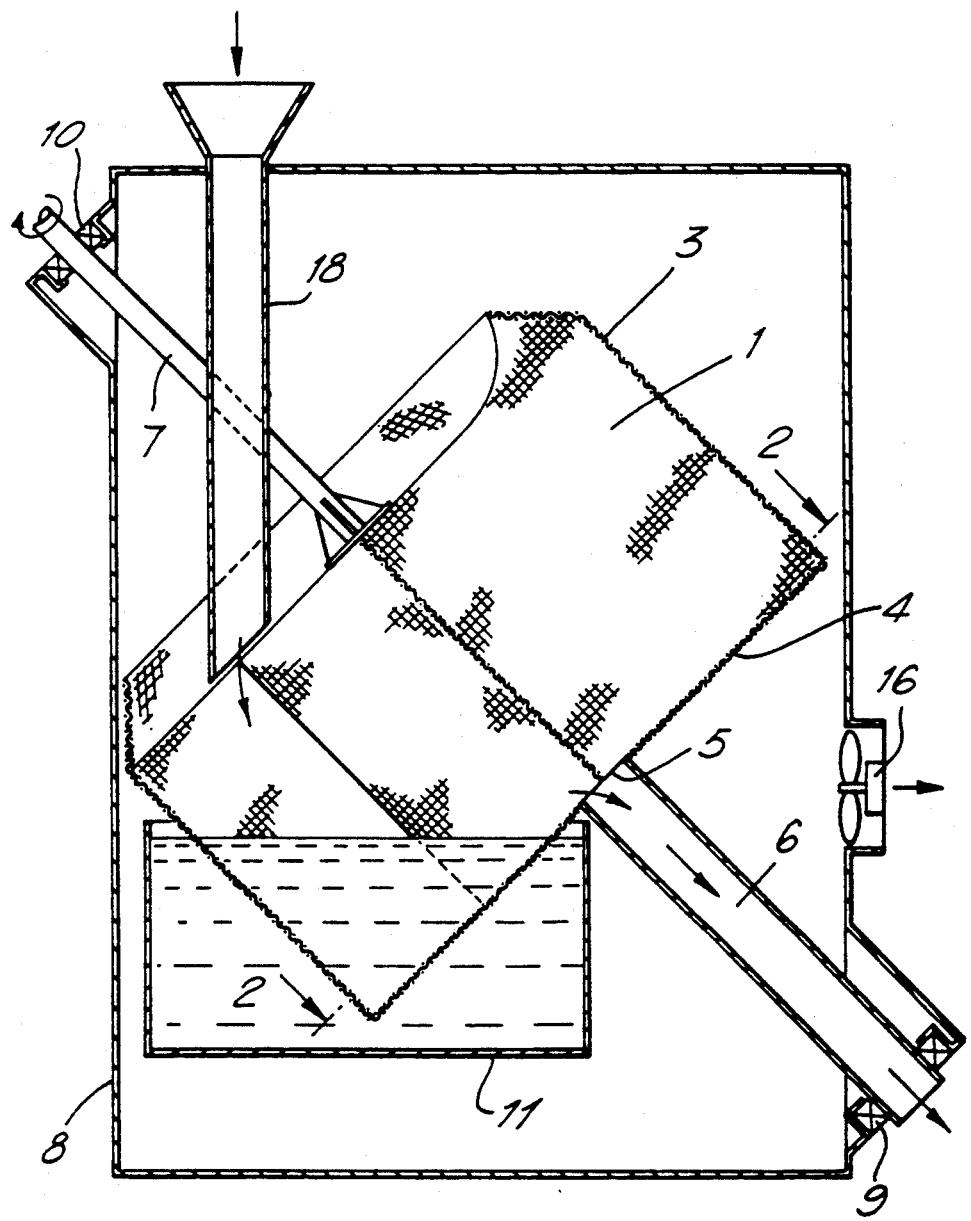
FIG. 1 is cross-section in elevation through an apparatus for cooling products.
Figure 2:
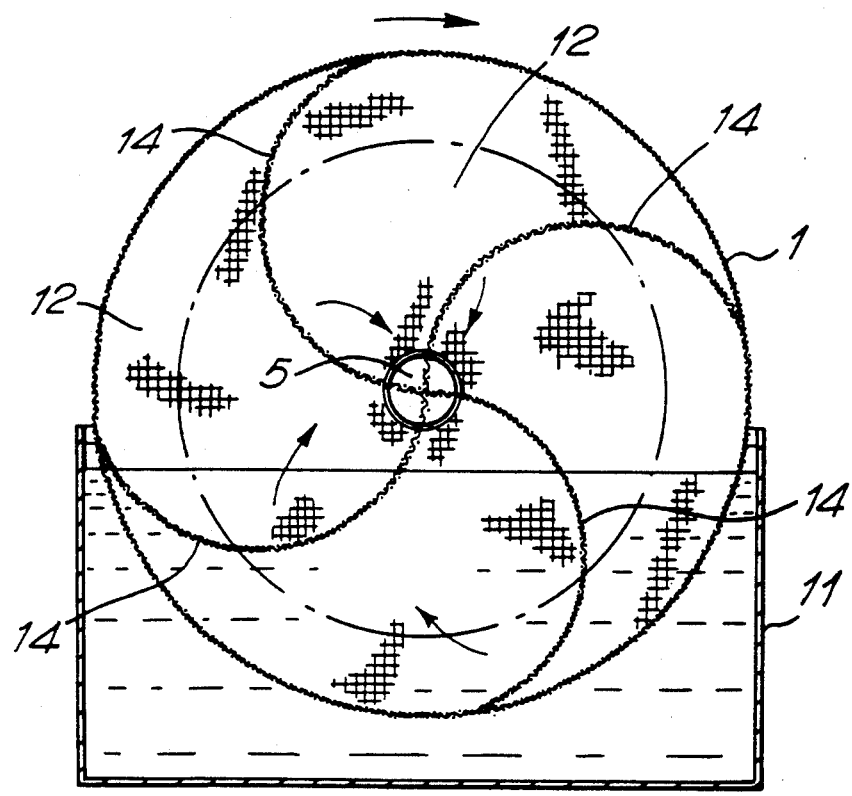
FIG. 2 is a cross-section on the line 2—2 of FIG. 1.

An shown in FIGS. 1 and 2, an apparatus for cooling products such as solid foodstuffs includes a rotary drum 1 made, for example, of stainless steel mesh. The drum 1 is open on one (upper as shown in FIG. 1) face and consists of a hollow interior defined by a peripheral surface 3 and a base surface 4. The central axis of the drum 1 which is also, as shown, the axis of rotation is at an angle to the horizontal. An outlet 5 is located along the central axis at the base surface 4 and the outlet 5 communicates with a chute 6. Opposite the outlet 5 and extending in the opposite direction from the chute 6 is a motor drive shaft 7.

The chute 6 and shaft 7 extend through the walls of a housing 8 in which the drum 1 is located and are mounted respectively in bearings 9, 10 each located outside the housing 8.

The drum 1 is divided into compartments 12 by a plurality of partitions 14. Each partition 14 has a generally curved configuration as best seen in FIG. 2. The partitions are also made from mesh of a material suitable for use in contact with cryogenic fluids. The open face of the drum 1 provides an inlet for each compartment as will be explained.

Also positioned within the housing 8 is a vessel 11 containing cryogenic fluid such as liquid nitrogen. The position of the vessel 11 relative to the drum 1 is such that during rotation of the drum 1 each compartment 12 will successively descend into and rise from the cryogenic liquid contained in the vessel 11.

On one wall of the housing 8 is an extraction fan 16.

Also extending through a wall of the housing 8 is a delivery means in the form of a hopper 18 which terminates at its inner end adjacent the open face of the drum 1.

In use, the drum 1 is rotated at a predetermined speed by means of a motor (not shown) which can either be directly or indirectly coupled to the shaft 7 in a manner known in the art.

Product to be cooled passes through hopper 18 via the open face of the drum 1 into successive compartments 12 as they rotate beneath the inner or lower end of the chute 18. Each compartment 12 will successively descend into the cryogenic fluid contained within the vessel 11 and rise out from said cryogenic fluid. The time that the products are submerged within the cryogenic fluid is dictated by the speed of revolution of the drum 1 and this is predetermined so that the products are frozen as they rise out of the cryogenic fluid.

By virtue of the angle of the axis of rotation of the drum 1 products will tend to move under gravity towards the base surface 4. However, as the compartments rise from the cryogenic fluid the curvature of the partitions 14 will guide the products under gravity towards the central outlet 5 and hence through the chute 6.

The fan 16 is used to withdraw nitrogen vapour from the interior of the housing 8.

Once the products fall down the chute 6 they can be caught in a receptacle or conveyer in a manner known per se.

Figure 4:
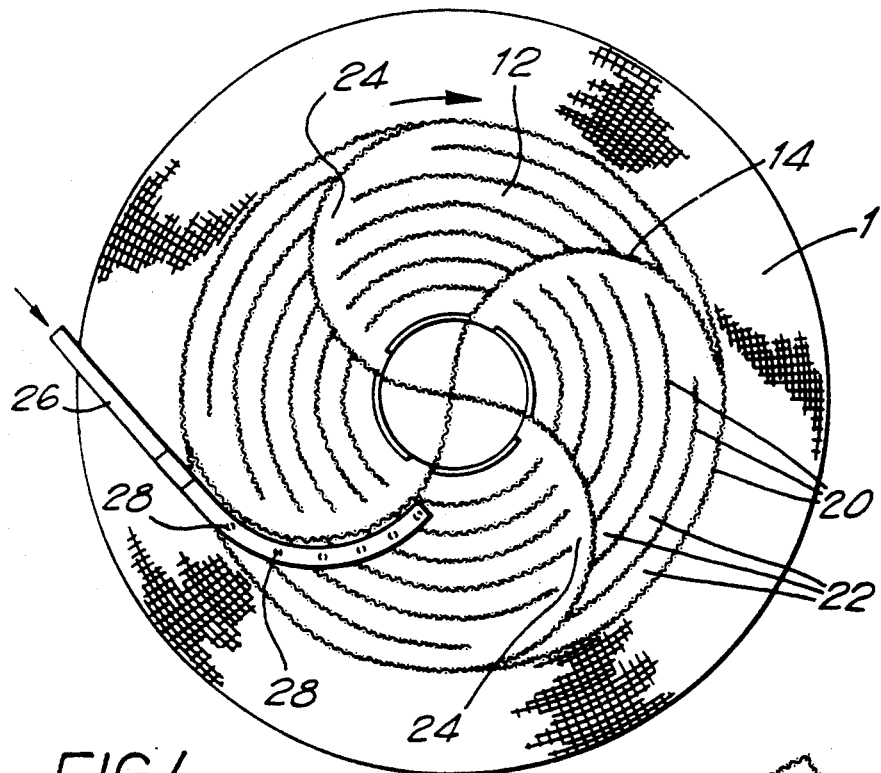
FIG. 4 is a detail showing the relationship between sub-compartments in a rotary drum forming part of the apparatus of FIG. 3.
Figure 3:
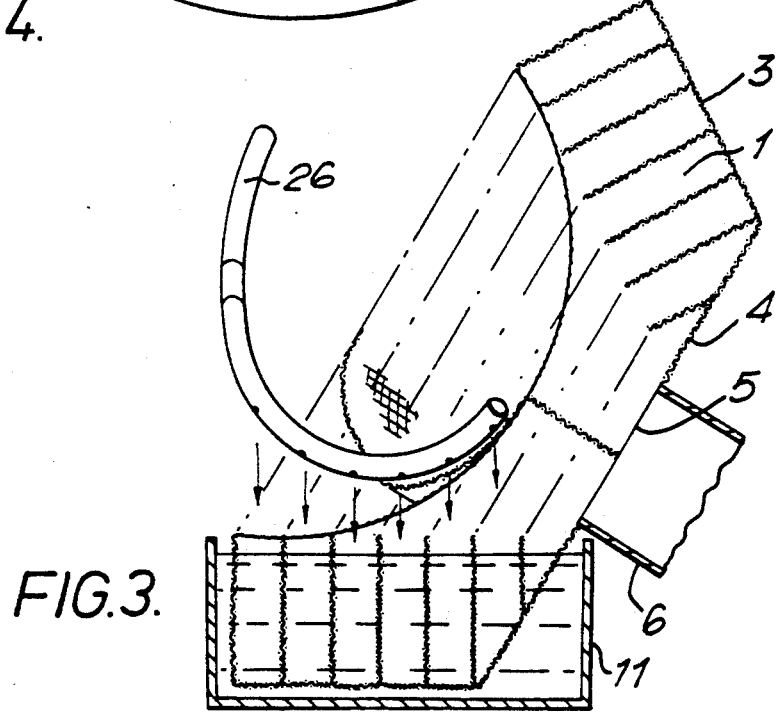
FIG. 3 is a detail in cross-section of a further apparatus for cooling liquid products.

Referring now to FIGS. 3 and 4, there is illustrated an apparatus for freezing liquid products. For convenience, like reference numerals used in FIGS. 3 and 4 designate like features to those described in the embodiment illustrated in FIGS. 1 and 2.

The apparatus of FIGS. 3 and 4 includes a drum 1 made from mesh material, for example, stainless steel. The drum 1 is open at one (upper as shown in FIG. 3) face and consists of a hollow interior defined by a peripheral surface 3 and a base surface 4.

The central axis of the drum 1 which is also the axis of rotation is at an angle to the horizontal. An outlet 5 is located along the central axis at the base 4 and the outlet 5 communicates with the chute 6. Although not shown, opposite the outlet 6 and extending in the opposite direction from the chute 6 is a motor drive shaft. The chute 6 and shaft extend through walls of a housing (not shown) in which the drum is located and each are mounted in bearings located outside the housing as described in the embodiment illustrated in FIGS. 1 and 2.

The drum 1 is divided into compartments 12 by a plurality of partitions 14. Within each compartment 12 there are provided barriers 20 which divided each compartment into sub-compartments 22. As shown, the sub-compartments 22 within each compartment 12 are arranged concentrically with respect to each other. Each barrier 20 within a compartment does not extend the full width of the compartment but is spaced from one partition to define a path 24 for communication with the outlet 5.

A pipe 26 extends through the housing (not shown) and its inner end is located above the open face of the drum 1 at a position immediately above the vessel 11. Outlet ports 28 are spaced along the pipe 26 such that each port 28 is aligned with a sub-compartment 22 of a compartment 12 when said compartment 12 is immersed in cryogenic fluid contained within the vessel 11.

In use, the drum 1 is rotated at a predetermined speed by means of a motor in the manner described with reference to the embodiment illustrated in FIGS. 1 and 2.

Liquid product flows through the tube 26 and exits through the ports 28 directly into the sub-compartments 22 which are immersed in the cryogenic fluid contained within the vessel 11.

The liquid product freezes and as the compartment 12 moves free of the cryogenic fluid it will move under gravity towards the base surface 4. However, the curvature of the partitions 14 will guide the frozen product towards the path 24 and hence towards the outlet 5. The product will then proceed along the chute 6 towards a receptacle or conveyer in a manner known per se.

It will be observed that the partitions 14 all meet at the centre of the drum to prevent the products from falling into the following compartment and consequently re-entering the vessel 11.

A particular advantage of the above described embodiment is that the bearings as well as the drive motor are mounted externally of the housing 8 to avoid the cryogenic temperatures within the housing 8.

Although not specifically shown and described the vessel 11 has a solenoid valve operated inlet and manual drain valves. It is also provided with level probes to determine the liquid nitrogen level in the vessel 11.

The housing 8 is provided with access panels to allow for cleaning, maintenance and inspection purposes.

We claim:

1. An apparatus for cooling products comprising a drum mounted for rotary movement such that a portion of its periphery extends into a vessel for containing cryogenic fluid, at least one partition dividing the drum into compartments such that on rotation of the drum each compartment successively descends into and rises from cryogenic fluid when contained in the vessel, an inlet for delivering products to successive compartments as the drum rotates and an outlet for cooled products located along the central axis of the drum at one surface thereof, the axis of rotation of the drum being arranged at an angle to the horizontal greater than 0° such that products within the compartments will move under gravity towards said one surface.

2. An apparatus as claimed in claim 1, in which the drum and the vessel are each located within a housing, a delivery means extending from outside the housing to the inlet for delivering products to be cooled and a chute extending from the outlet at said one surface to a location outside the housing for the passage there along of the cooled products.

3. An apparatus as claimed in claim 2, in which the chute is mounted in bearings located externally of the housing and a shaft extends from the opposite second surface of the drum through the housing and is mounted in bearings located externally of the housing.

4. An apparatus as claimed in claims 1, 2 or 3, in which a plurality of partitions are provided, each partition being curved such that during rotation of the drum product at or adjacent the radial extremity of a partition will be guided under gravity towards the central outlet at said one surface of the drum.

5. An apparatus as claimed in any one of claims 1 to 3, in which each compartment has located therein spaced barriers which define between them sub-compartments, and a path from each sub-compartment communicating with the outlet.

6. An apparatus as claimed in claim 5, in which the delivery means is a pipe having at one end outlet ports each port being aligned with a sub-compartment when said compartment is located within the vessel.

7. An apparatus as claimed in any of one claims 1 to 6, in which the drum and said at least one partition is made from mesh material.

8. An apparatus as claimed in any one of claims 2 to 3, in which an extractor fan is located in a wall of the housing.

* * * * *